(12) United States Patent
Wan

(10) Patent No.: US 7,840,958 B1
(45) Date of Patent: Nov. 23, 2010

(54) PREVENTING SPYWARE INSTALLATION

(75) Inventor: Xiaochuan Wan, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 1298 days.

(21) Appl. No.: 11/356,600

(22) Filed: Feb. 17, 2006

(51) Int. Cl.
*G06F 9/445* (2006.01)

(52) U.S. Cl. ..................... 717/174

(58) Field of Classification Search ......... 726/22–28; 717/174–178
See application file for complete search history.

(56) References Cited

U.S. PATENT DOCUMENTS

| | | | |
|---|---|---|---|
| 5,950,003 A * | 9/1999 | Kaneshiro et al. ............ | 717/130 |
| 6,002,869 A * | 12/1999 | Hinckley .................... | 717/124 |
| 6,161,130 A | 12/2000 | Horvitz et al. | |
| 6,266,811 B1 * | 7/2001 | Nabahi ...................... | 717/174 |
| 6,539,501 B1 * | 3/2003 | Edwards ..................... | 714/45 |
| 6,785,818 B1 * | 8/2004 | Sobel et al. .................. | 726/22 |
| 6,973,577 B1 | 12/2005 | Kouznetsov | |
| 7,039,830 B2 | 5/2006 | Qin | |
| 7,093,239 B1 * | 8/2006 | van der Made ............. | 717/135 |
| 7,103,913 B2 | 9/2006 | Arnold et al. | |
| 7,120,901 B2 * | 10/2006 | Ferri et al. .................. | 717/128 |
| 7,181,583 B2 | 2/2007 | Saika | |
| 7,188,369 B2 | 3/2007 | Ho et al. | |
| 7,228,566 B2 * | 6/2007 | Caceres et al. ............... | 726/25 |
| 7,263,616 B1 * | 8/2007 | Brackett .................... | 713/188 |
| 7,370,360 B2 * | 5/2008 | van der Made ............... | 726/24 |
| 7,376,970 B2 | 5/2008 | Marinescu | |
| 7,398,553 B1 * | 7/2008 | Li .............................. | 726/22 |
| 7,409,719 B2 | 8/2008 | Armstrong et al. | |
| 7,441,234 B2 * | 10/2008 | Cwalina et al. ............. | 717/128 |
| 7,487,543 B2 * | 2/2009 | Arnold et al. ................ | 726/24 |
| 7,526,809 B2 * | 4/2009 | Liang et al. ................. | 726/24 |
| 7,562,391 B1 * | 7/2009 | Nachenberg et al. ......... | 726/23 |
| 7,577,943 B2 * | 8/2009 | Chilimbi et al. ............ | 717/130 |
| 2003/0041316 A1 * | 2/2003 | Hibbeler et al. ............. | 717/130 |
| 2003/0159070 A1 * | 8/2003 | Mayer et al. ................ | 713/201 |
| 2003/0159133 A1 * | 8/2003 | Ferri et al. .................. | 717/130 |
| 2003/0187853 A1 | 10/2003 | Hensley et al. | |
| 2003/0212902 A1 * | 11/2003 | van der Made ............. | 713/200 |
| 2004/0015879 A1 * | 1/2004 | Pauw et al. ................ | 717/127 |

(Continued)

OTHER PUBLICATIONS

Office Action dated Jan. 16, 2009 in U.S. Appl. No. 11/247,349.

(Continued)

*Primary Examiner*—Anna Deng
(74) *Attorney, Agent, or Firm*—Beyer Law Group LLP (57) ABSTRACT

A computer or its user can prevent the installation of spyware on the computer by having a program that continuously observes and collects data on execution and installation behavior on the computer. This behavior can relate to execution of any application or installation of any type of software. The program uses various installation detection programs and an event collector that continuously observes and gathers data on execution and installation activities on the computer. The program then uses pre-defined rules to determine whether the behavior or activity correlates to spyware installation, which can occur through various methods and means that are often difficult to detect. However, by establishing a comprehensive set of rules that focus on the spyware installation behavior, the program of the present invention is able to detect when spyware is likely being installed and either alert the user who can prevent further installation or execution or automatically do so.

15 Claims, 6 Drawing Sheets

U.S. PATENT DOCUMENTS

| | | | |
|---|---|---|---|
| 2004/0034794 A1* | 2/2004 | Mayer et al. | 713/200 |
| 2004/0034813 A1 | 2/2004 | Chaboud et al. | |
| 2004/0064736 A1* | 4/2004 | Obrecht et al. | 713/201 |
| 2004/0073653 A1* | 4/2004 | Hunt et al. | 709/224 |
| 2004/0153878 A1* | 8/2004 | Bromwich et al. | 714/48 |
| 2004/0158819 A1* | 8/2004 | Cuomo et al. | 717/128 |
| 2004/0250107 A1* | 12/2004 | Guo | 713/200 |
| 2005/0033553 A1* | 2/2005 | Swaine et al. | 702/176 |
| 2005/0081053 A1* | 4/2005 | Aston et al. | 713/200 |
| 2005/0268338 A1* | 12/2005 | Made | 726/24 |
| 2006/0015940 A1* | 1/2006 | Zamir et al. | 726/22 |
| 2006/0041942 A1* | 2/2006 | Edwards | 726/26 |
| 2006/0047931 A1 | 3/2006 | Saika | |
| 2006/0075499 A1* | 4/2006 | Edwards et al. | 726/24 |
| 2006/0123481 A1* | 6/2006 | Bhatnagar et al. | 726/24 |
| 2006/0136720 A1 | 6/2006 | Armstrong et al. | |
| 2006/0136771 A1 | 6/2006 | Watanabe | |
| 2006/0137010 A1 | 6/2006 | Kramer et al. | |
| 2006/0150256 A1* | 7/2006 | Fanton et al. | 726/27 |
| 2006/0156397 A1* | 7/2006 | Dai | 726/22 |
| 2006/0230451 A1* | 10/2006 | Kramer et al. | 726/22 |
| 2006/0242636 A1* | 10/2006 | Chilimbi et al. | 717/158 |
| 2006/0242701 A1* | 10/2006 | Black et al. | 726/22 |
| 2007/0022287 A1* | 1/2007 | Beck et al. | 713/164 |
| 2007/0028110 A1* | 2/2007 | Brennan | 713/176 |
| 2007/0074169 A1* | 3/2007 | Chess et al. | 717/126 |
| 2007/0094728 A1* | 4/2007 | Julisch et al. | 726/23 |
| 2007/0094734 A1* | 4/2007 | Mangione-Smith et al. | 726/24 |
| 2007/0150957 A1* | 6/2007 | Hartrell et al. | 726/24 |
| 2007/0162975 A1* | 7/2007 | Overton et al. | 726/24 |
| 2007/0168285 A1* | 7/2007 | Girtakovskis et al. | 705/50 |
| 2007/0180528 A1* | 8/2007 | Kane | 726/24 |
| 2007/0256127 A1* | 11/2007 | Kraemer et al. | 726/23 |
| 2007/0271273 A1* | 11/2007 | Cradick et al. | 707/10 |
| 2008/0066069 A1* | 3/2008 | Verbowski et al. | 718/102 |
| 2008/0256137 A1* | 10/2008 | Kawamura et al. | 707/200 |
| 2008/0289042 A1* | 11/2008 | Bai et al. | 726/24 |
| 2009/0055166 A1* | 2/2009 | Moyle | 704/9 |
| 2009/0083855 A1* | 3/2009 | Apap et al. | 726/24 |

OTHER PUBLICATIONS

Office Action dated Feb. 18, 2009 in U.S. Appl. No. 11/181,320.
Office Action dated Apr. 2, 2009 in U.S. Appl. No. 11/204,567.
Office Action dated Sep. 15, 2009 in U.S. Appl. No. 11/181,320.

* cited by examiner

PREVENTING SPYWARE INSTALLATION

FIELD OF THE INVENTION

The present invention relates generally to computer software programs intended to address malicious software in computer systems. More specifically, the present invention relates to detecting the possible installation of spyware on a computer and blocking the installation process.

BACKGROUND OF THE INVENTION

Spyware is one category of malicious software, also referred to as malware, that intercepts or takes partial control of a computer's operation without the user's informed consent. Although the term "spyware" taken literally suggests software that surreptitiously monitors a user, the term has come to refer broadly to software that subverts the computer's operation for the benefit of a third party. Spyware differs from other types of malware in that it does not normally self-replicate. Typical tactics taken by spyware for commercial gain include delivery of unsolicited pop-up advertisements, theft of personal information, monitoring of Web-browsing activity, and routing of HTTP requests to advertising sites.

Spyware does not spread in the same manner as other malware; generally, a spyware infected system does not attempt to transmit the spyware to other computers. Instead, spyware gets on a system through deception of the user or exploitation of software vulnerabilities, such as security holes in Web browsers.

The most direct and common route of spyware getting on a computer is by having an unsuspecting user installing it. Spyware often bundles itself with other desirable software or is installed by itself but disguised as software, such as a utility, that the user is interested in and wants. The "bundled" form of entry often occurs with shareware or other downloadable software. The unbundled deceptive or disguised form of entry—the so-called Trojan Horse—often comes in the form of a useful utility or a helpful software agent (e.g., a Web accelerator or "price comparator" online shopping agent).

Another way spyware can make it on a computer is by the spyware or a scouting-type program manipulating security features on a computer's Web browser that are designed to prevent unwanted installations and, through this manipulation, taking advantage of security holes. For example, Web browsers such as Internet Explorer, are designed to prevent Web sites from initiating downloads that are not requested or initiated by the user. However, spyware authors can trick users into initiating a download (e.g., a pop-up ad may be made to appear like a standard Windows dialog box) or trick them into beginning a download regardless of what action the user takes, such as clicking on "No", "Do Not Accept", or "Close Window". Spyware authors can take advantage of other security holes in a Web browser or other software. For example, when a user navigates a Web page controlled by a spyware author, the page may contain software that attacks the browser and forces the download and installation of spyware, often in the form of Browser Helper Object ("BHO") plug-ins. Internet Explorer in particular also serves as a point of attachment for this type of software which facilitates installation as BHOs. Finally, in less common cases, spyware is delivered as the payload of a WORM or other form of malware.

Various methods have been developed to detect installation of spyware, whereby the installation occurs via the tactics described above. However, these methods have not been able to adequately block the installation of spyware. For example, one method of detecting spyware, and malware in general, is using a predefined pattern database. Such a predefined database is unable to detect new spyware. Another method is using predefined rules for detecting unknown spyware (which take into account characteristics of a portable executable and an imported API). However, the rules have to be entered manually whenever a new spyware program is detected and thus are difficult or impractical to maintain. In addition, since the number of rules is limited, the method is unable to achieve both a high accurate detection rate and, at the same time, a low false-positive detection rate.

Another method that has been suggested is directly alerting the user of software downloads that can potentially or actually lead to the downloading of spyware, such as the downloading of BHOs. In this approach, the user is informed of the potential danger and the final decision is left to the user. That is, the user must make the ultimate determination of whether the software being downloaded is spyware and act accordingly. This is clearly impractical and burdensome for the vast majority of users who likely do not have the technical knowledge or are not sufficiently tech-savvy to further investigate on their own.

Thus, it would be desirable to have a program that executes on a computer that effectively detects the installation of spyware and prevents the installation, and is able to do both without human intervention and regardless of the manner in which the spyware is being installed.

SUMMARY OF THE INVENTION

To achieve the foregoing, and in accordance with the purpose of the present invention, a spyware installation prevention program capable of detecting execution and installation behavior on a computer and determining whether the activity is potentially related to spyware and preventing its installation or alerting the user to the activity.

In one aspect of the invention, a method of preventing the installation of spyware is described. Installation and execution data on a computer is collected using an event collector and external installation detection tools such as key loggers and hidden process detectors. Upon collecting this data continuously, the data are used as input to one or more correlation rules. In one embodiment, the data are transformed into feature values. The output of the correlation rules are examined to determine whether spyware is being installed on the computer. If this determination is found, a user is alerted or the installation is automatically terminated.

In another aspect of the invention, a system for preventing the installation of spyware is described. The system consists of various components including an event collector module for observing and collecting installation and execution-related data, a correlation engine, and a correlation rule set containing a rule for determining whether spyware is being installed based on the installation and execution-related data.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention is applicable to all malicious software, or malware, that generally causes harm to a computer system, provides an effect that is not expected by the user, is undesirable, illegal, or otherwise causes the user to want to restore their computer system from a time prior to when it was infected by the malware. Malware can be classified based upon how is executed, how it spreads or what it does. The below descriptions are provided as guidelines for the types of malware currently existing; these classifications are not perfect in that many groups overlap. For example, commercially available "anti-virus" software is designed to scan a computer for viruses and worms, as well as other malicious software. Of course, later developed software not currently known may also fall within the definition of malware.

When computer viruses first originated common targets were executable files and the boot sectors of floppy disks; later targets were documents that contain macro scripts, and more recently, many computer viruses have embedded themselves in e-mail as attachments. With executable files the virus arranges that when the host code is executed the virus code is executed as well. Normally, the host program continues to function after it is infected by the virus. Some viruses overwrite other programs with copies of themselves, thus destroying the program. Viruses often spread across computers when the software or document to which they are attached is transferred from one computer to another. Computer worms are similar to viruses but are stand-alone software and thus do not require host files or other types of host code to spread themselves; they can move over the Internet using e-mail or socket connections. They do modify the host operating system, however, at least to the extent that they are started as part of the boot process. In order to execute, worms either exploit some vulnerability of the target host or use some kind of social engineering to trick users into executing them. Once executed, a computer worm might drop a backdoor program or a computer virus.

A Trojan horse program is a harmful piece of software that is often disguised as legitimate software. Trojan horses cannot replicate themselves, unlike viruses or worms. A Trojan horse can be deliberately attached to otherwise useful software by a programmer, or can be spread by tricking users into believing that it is useful. Some Trojan horses can spread or activate other malware, such as viruses (a dropper). An example of a Trojan horse is a program called Gpcoder that encrypts documents, spreadsheets and database files on a user's computer. The program then leaves the user a message about how to obtain a program for $200 that would remove the encryption. A wabbit is a third, uncommon type of self-replicating malware. Unlike viruses, wabbits do not infect host programs or documents. And unlike worms, rabbits do not use network functionality to spread to other computers. A simple example of a wabbit is a fork bomb.

Spyware is a piece of software that collects and sends information (such as browsing patterns or credit card numbers) about users and the results of their computer activity without explicit notification. Spyware usually works and spreads like Trojan horses. The category of spyware may also include adware that a user deems undesirable. Sometimes the term spyware is used to refer to more traditional malicious software such as viruses and worms. A backdoor is a piece of software that allows access to the computer system by bypassing the normal authentication procedures. There are two groups of backdoors depending upon how they work and spread. The first group work much like a Trojan horse, i.e., they are manually inserted into another piece of software, executed via their host software and spread by the host software being installed. The second group work more like a worm in that they get executed as part of the boot process and are usually spread by worms carrying them as their payload. The term ratware has arisen to describe backdoor malware that turns computers into zombies for sending spam.

An exploit is a piece of software that attacks a particular security vulnerability. Exploits are not necessarily malicious in intent—they are often devised by security researchers as a way of demonstrating that vulnerability exists. They are, however, a common component of malicious programs such as network worms. A root kit is software inserted onto a computer system after an attacker has gained control of the system. Root kits often include functions to hide the traces of the attack, as by deleting logged entries or by cloaking the attacker's processes. Root kits might include backdoors, allowing the attacker to easily regain access later or to exploit software to attack other systems. Because they often hook into the operating system at the kernel level to hide their presence, root kits can be very hard to detect.

Key logger software is software that copies a computer user's keystrokes to a file which it may send to a hacker at a later time. Often the key logger software will only awaken when a computer user connects to a secure web site such as a bank. It then logs the keystrokes, which may include account numbers, PINs and passwords, before they are encrypted by the secure web site. A dialer is a program that replaces the telephone number in a modem's dial-up connection with a long-distance number (often out of the country) in order to run up telephone charges on pay-per-dial numbers, or dials out at night to send key logger or other information to a hacker. Software known as URL injection software modifies a browser's behavior with respect to some or all domains. It modifies the URL submitted to the server to profit from a given scheme by the content provider of the given domain. This activity is often transparent to the user.

Another type of malicious software performs extortion on a vast scale, such as threatening to take down an Internet web site (such as a gambling web site) during time sensitive events. An attacker would attempt to shut down an Internet site by using thousands of so-called "zombie" or "robot" personal computers that have been secretly taken over by malicious software. These computers could be used to simultaneously deluge a web site with incoming messages that would paralyze the web site.

Figure 1:
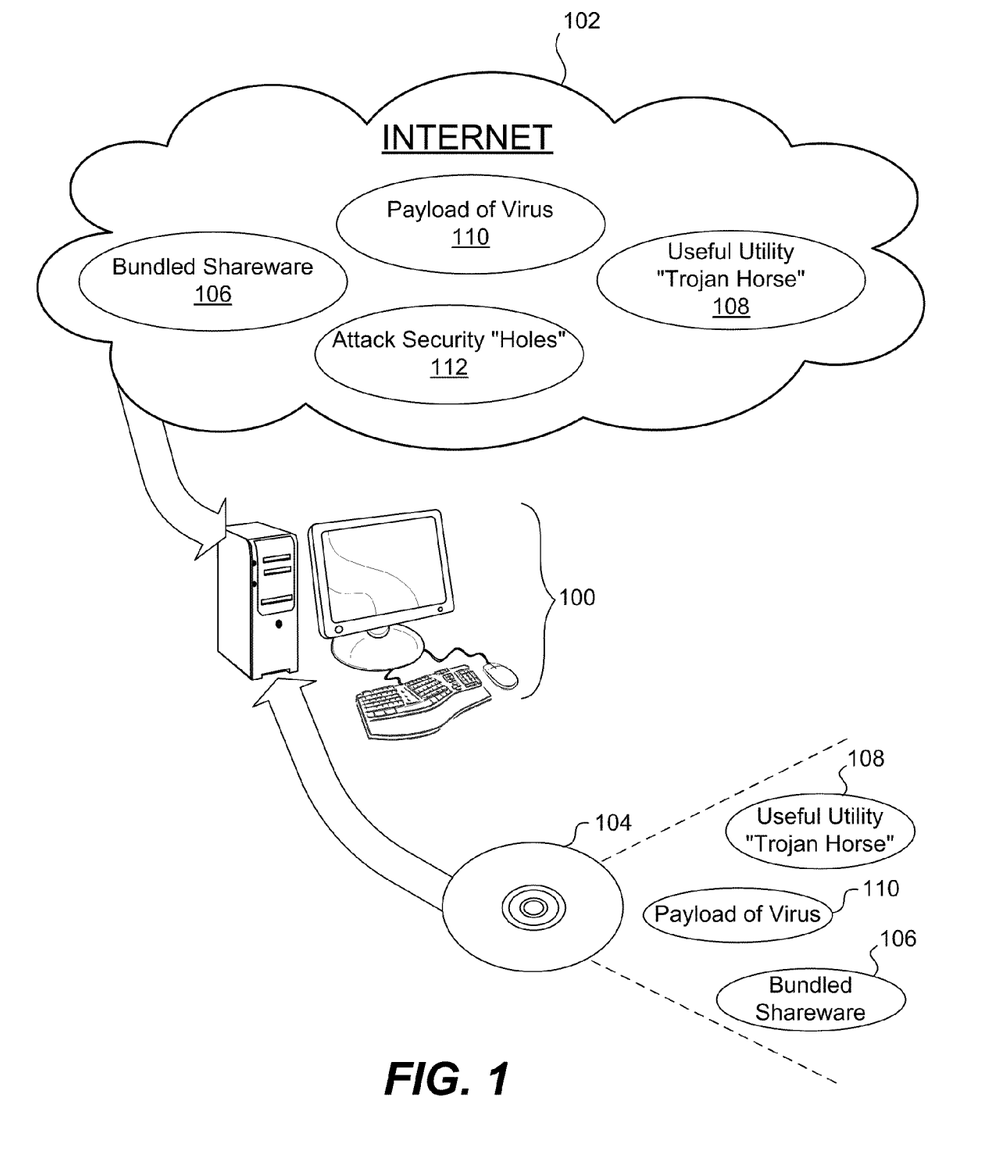
FIG. 1 is an illustration showing the various types or modes of spyware installation and the two prevalent transmission modes spyware gets on a computer system.

Methods and systems for preventing installation of spyware on a computer are described in the various figures. To describe the spyware installation prevention techniques of the present invention, it is useful to first explain the prevalent ways of how spyware infects a computer system. FIG. 1 is an illustration showing the various types or modes of spyware installation and the two most common transmission means through which spyware infects a computer system. A computer 100 can be infected by spyware from Internet downloads and other computer networks or from a portable storage medium, represented by compact disk (e.g., CD-ROM) 104. Examples of delivery and installation methods via Internet 102 include bundled shareware 106, useful utility 108, also referred to as a "Trojan Horse", as a payload of a virus 110, such as a WORM, and attacking a security "hole" 112 of a Web browser. The vast majority of spyware is installed via one of these methods. Useful utility 108, payload of a virus 110, and bundled share 106 can also be installed on computer 100 via portable storage medium 104. In another preferred embodiment, computer system 100 can be part of a network, such as a VPN or VLAN, and can be infected by downloads from a local or private network in addition to being infected via downloads from Internet 100. Computer system 100 can also be a laptop computer or a wireless hand-held computing device receiving downloads from Internet 100 or other wireless network. Computer system 100 can be either a client computer, a server computer, or a stand-alone computer. The methods of installation shown in FIG. 1 are illustrative. Other methods are likely to develop as spyware and Internet technology advance. For example, one method not shown is referred to as stealth installation in which a user is not aware that any installation is taking place (similar to the WORM payload 110 and Web browser security gap 112 modes). However, the processes of the present invention as described in the figures can be applied generally without regard to method or mode of delivery and installation of the spyware. The methods and systems described herein apply to any installation and related installation behavior that takes place on computer system 100 regardless of the mode of installation.

Figure 2:
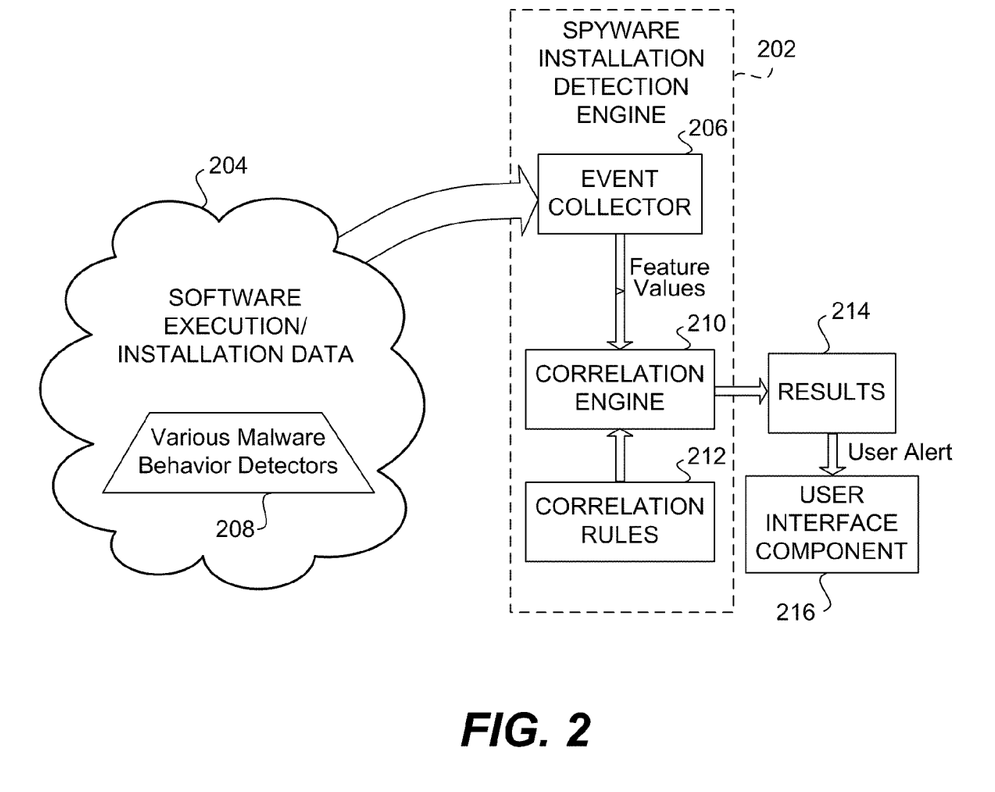
FIG. 2 is a block diagram of a spyware installation detection engine and various inputs and outputs of the engine in accordance with one embodiment of the present invention.

FIG. 2 is a block diagram of a spyware installation detection engine and of various inputs and outputs of the engine in accordance with one embodiment of the present invention. The primary inputs to installation detection engine 202 are installation and execution behavior data. These data include actions taken on or by files, registries, and processes on the computer system, such as computer system 100 and all its alternative embodiments as described in FIG. 1. In a preferred embodiment, software installation and related execution behavior data 204 includes data relating to files created and modified, registries created and modified, and to processes executing on the computer system. Behavior data 204 are input to installation detection engine 202 and, more specifically, received by an event collector 206, the input receiving component of spyware installation detection engine 202.

In another preferred embodiment, various existing malware and other generic application installation behavior detectors 208, such as keylogger detectors and hidden process detectors, collect data on installation activity on the computer and pass the data to event collector 206. Installation behavior detectors 208 can supplement the software installation behavior data 204. Event collector 206 transmits data, in the form of feature values, described in FIGS. 3, 4A and 4B below, to a correlation engine 210. Another input to correlation engine 210 is correlation rules 212. Correlation engine 210 and rules 212 are shown in greater detail in FIG. 3. Correlation engine 210 outputs correlation results 214 which can invoke a user alert at a user interface component 216 thereby making it visible to the user. In a preferred embodiment, installation detection engine 202 runs continuously while the computer is on. These components are described in greater detail in FIG. 3 and in the flow diagram of FIGS. 4A and 4B.

Figure 3:
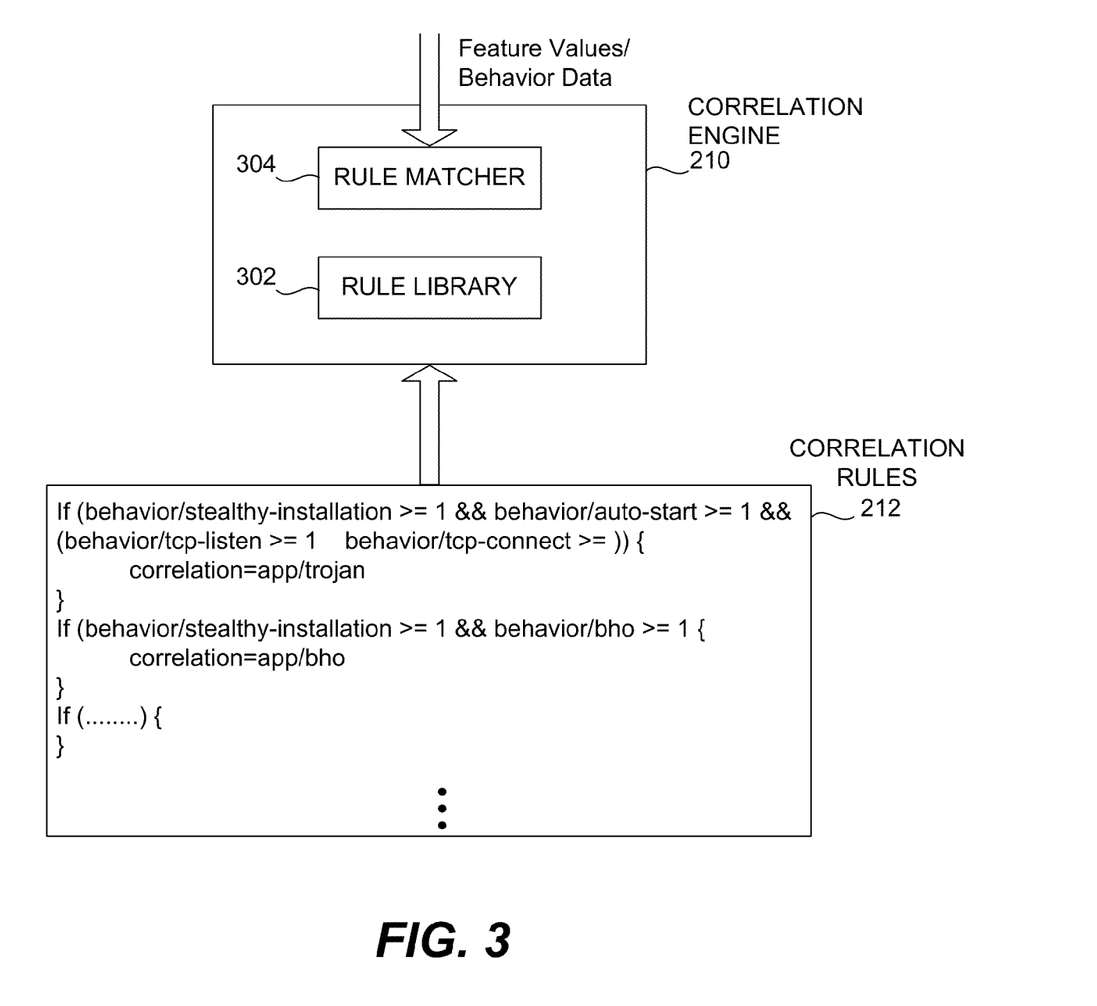
FIG. 3 is a block diagram of the internal modules of a correlation engine and samples of correlation rules in accordance with one embodiment of the present invention.

FIG. 3 shows the internal modules of correlation engine 210 and samples of correlation rules 212 in accordance with one embodiment of the present invention. The internal components or logic structure of correlation engine 210 are a rules library 302 and a rules matcher 304. Rules library 302 contains rules or is a representation of rule sets from correlation rules 212. Rule matcher 304 is the primary logic component of correlation engine 210. The input to rule matcher 304 is feature values from event collector 206. The feature values are then used or compared against each of the rules. The outcome of this function is a determination of whether the behavior represented by the feature values is spyware installation activity.

Figure 4A:
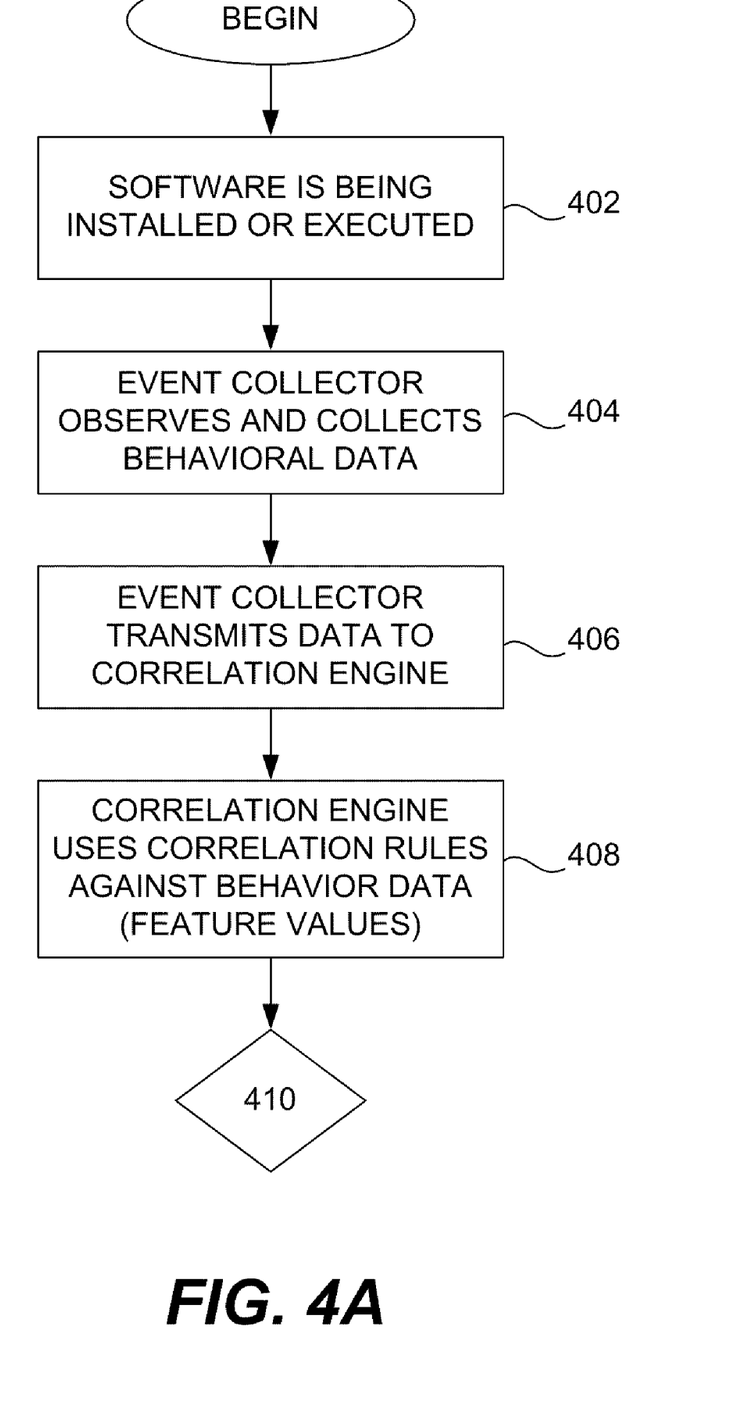
FIGS. 4A and 4B are flow diagrams of a spyware installation detection process in accordance with one embodiment of the present invention.
Figure 4B:
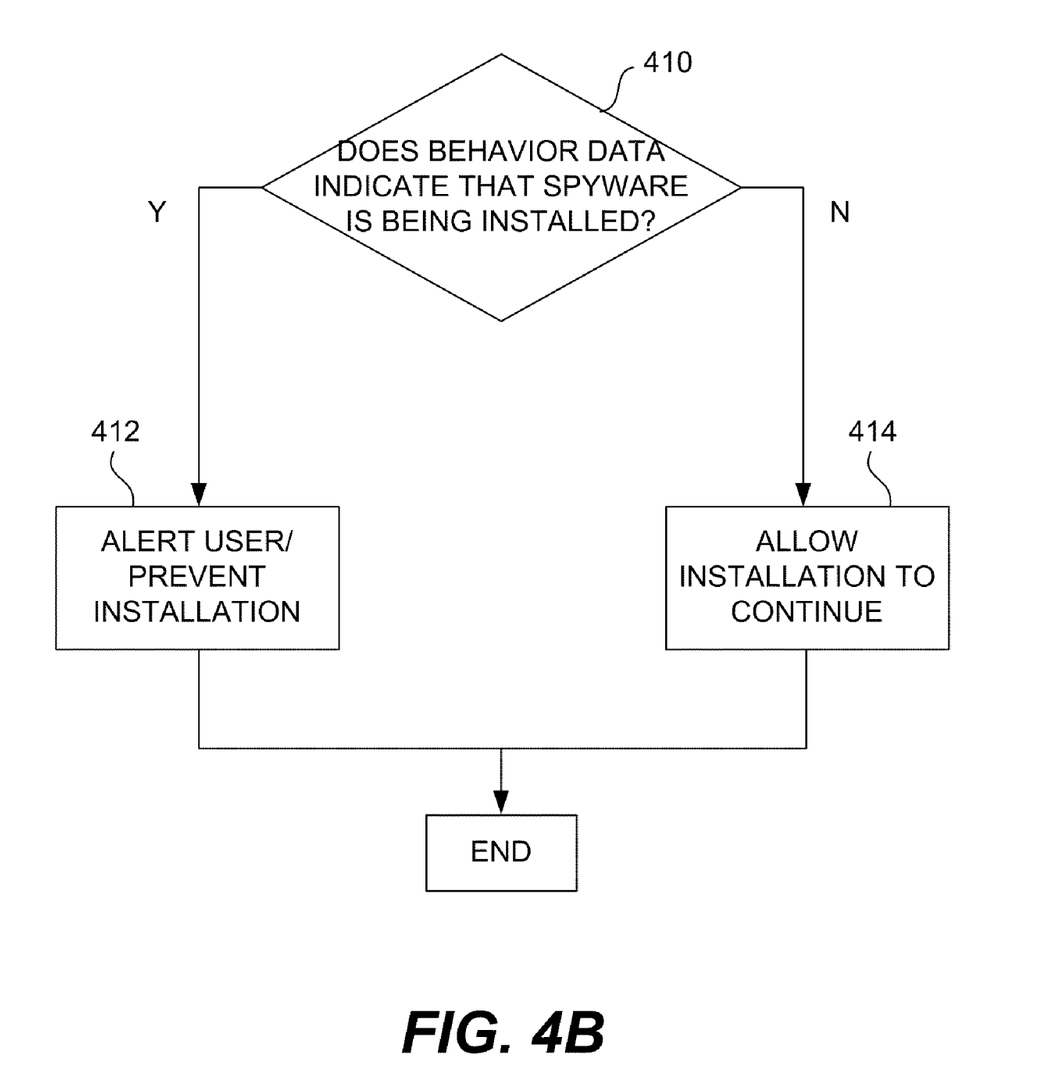

FIGS. 4A and 4B are flow diagrams of a spyware installation detection process in accordance with one embodiment of the present invention. The steps described in FIGS. 4A and 4B occur or execute on a computer system such as computer 100 and its equivalents. At step 402 an application or some type of software is being installed or is executing. Correlation engine 210 will determine using correlation rules 212 whether execution behavior is related to, for example, installer program execution (which can be different from installation behavior). For example, a user may be downloading shareware or an executable file from the Internet or following an installation "wizard" for installing an end-user application from a CD-ROM. The varieties of different types of installation and software execution that can occur are vast and vary widely. The present invention can be applied to various types of installations or execution of software.

At step 404 the event collector, which can also be referred to as a behavior detector, observes all software execution and installation activity on the computer. In a preferred embodiment, the event collector collects data relating to file creation/modification, registry creation/modification, and process execution. These activities are generally sufficient to determine whether installations are taking place. In another preferred embodiment the event collector can observe and collect data on other types of computer execution and installation-related activities.

At step 406 the event collector transmits the behavior data to the correlation engine. In a preferred embodiment, the behavior data are transformed into feature values, numeric values that represent the behavior data. The process for converting or transforming the data takes place in the event collector. In a preferred embodiment, a feature value represents a quantified value, e.g., an integer, of a particular behavior. The value can be a binary value, i.e., 0 or 1, which can indicate whether the behavior or feature exists. For example, if the value of behavior/is-service 0, then the application is not a service and 1 means the application is a service. If the feature value is a numeric value, from 0 to n, the meaning of each feature value depends on the feature. For example, the value of behavior/auto-start is the total count (e.g., 5) of different ways the application can start executing automatically. Converting the behavior data to the feature value is coded in correlation engine 210. It is expected that there will be around 20-30 feature values given that installation and execution behavior of spyware is limited to a certain number of installation modes and characteristics. Generally, the number of feature values is low compared with feature values, for example, in the context of classification engines, where the number of feature values can run in the hundred or thousands.

At step 408 the correlation engine uses pre-defined correlation rules to determine whether potential spyware is being installed or whether the installation activity is not related to spyware. An example of a pre-defined rule is If (behavior/stealthy-installation >=1 && behavior/auto-start >=1 && (behavior/tcp-listen >=1 ||behavior/tcp-connect >=1)) {
   correlation=app/trojan

}

In this rule, if an application has one or more stealthy installation methods, has one or more auto-start mechanisms, listens on more than one TCP ports, and connects to more than one host by TCP, then the application correlates to a deceptive or disguised program that is actually spyware or a Trojan Horse.

Another example of a rule is

If (behavior/stealthy-installation >=1 && behavior/bho >=1
{
    correlation=app/bho
}

In this rule, if an application installs multiple Browser Helper Objects (BHOs) and the installation method is stealthy, then the installed BHO is malware.

At step 410 the correlation engine determines whether the behavior data represented by the feature values indicates that spyware is being installed. Correlation engine 210 uses its rules library 302 and rules engine 304 to determine if the behavior is related to the installation of spyware. In a preferred embodiment, this is done using conditional logic. Correlation rules can be stored or hard coded in the correlation engine or defined in a separate file, as shown in FIG. 2. It may be preferable to keep the rules in a separate file to facilitate updating and maintenance. The correlation rules accept as input the feature values as variables. The rules define the various combinations of feature values in which an installation or software execution process correlates or qualifies as spyware.

If it is determined that the software executing or installing on the computer system is spyware, at step 412 the user is notified that spyware is likely being installed and the installation is blocked. In another preferred embodiment, the user is given the option to cease installation after being notified instead of the installation being automatically blocked. If it is determined that the feature values do not correlate to a potential spyware installation, the installation or software execution is allowed to proceed. In a preferred embodiment, the user is not notified. In another embodiment, the user is notified that no spyware is being installed. After either step 412 or 414 the process is complete.

Figure 5A:
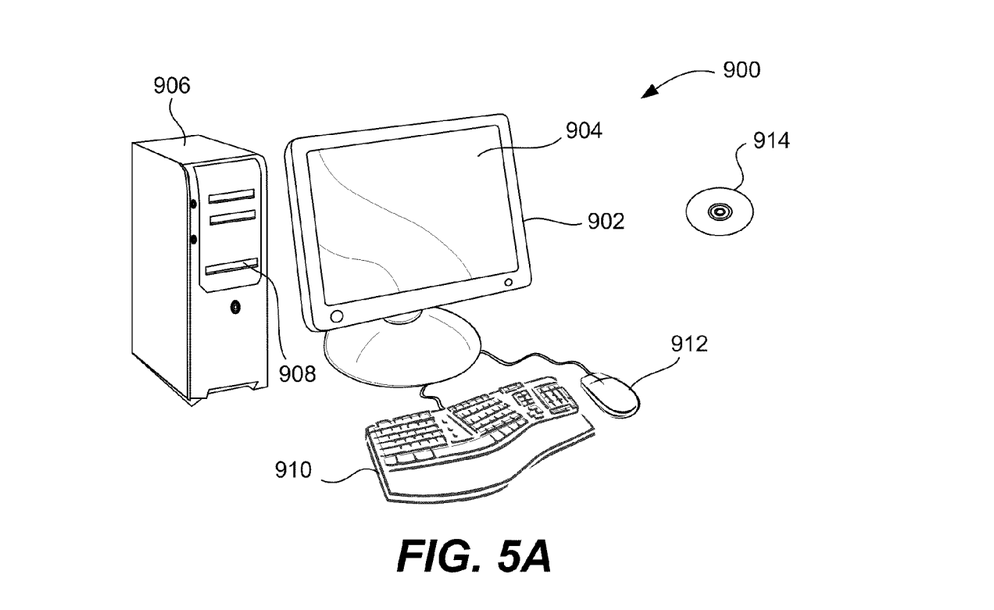
FIGS. 5A and 5B illustrate a computer system suitable for implementing embodiments of the present invention.
Figure 5B:
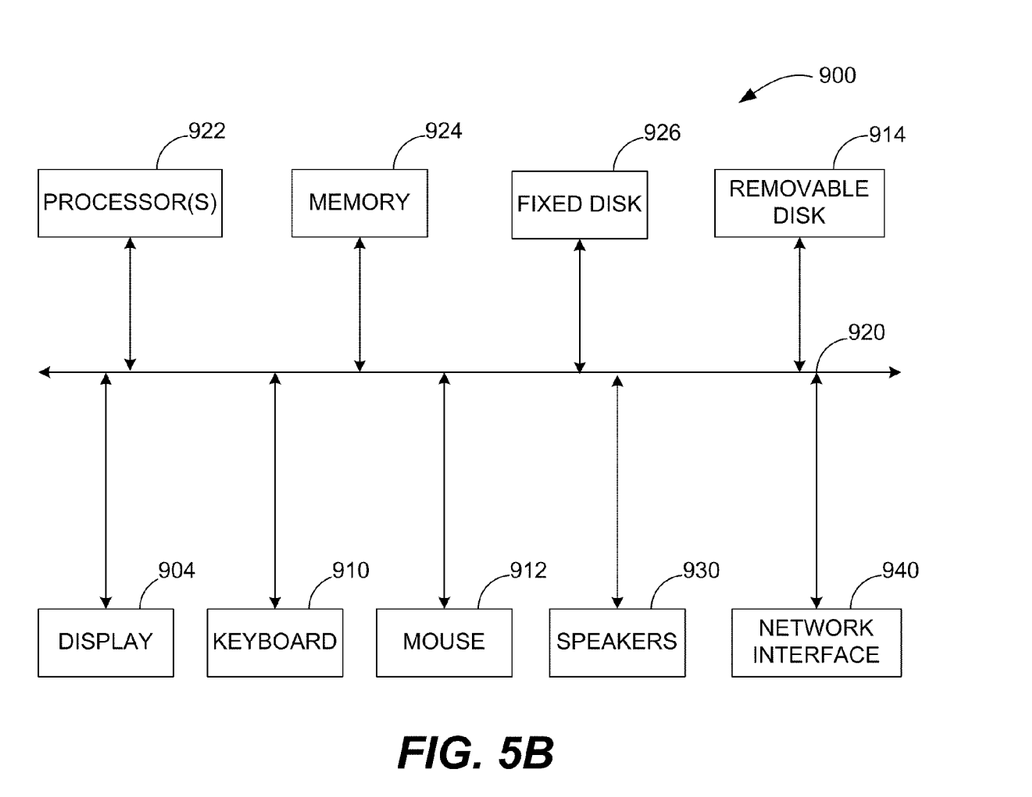

FIGS. 5A and 5B illustrate a computer system 900 suitable for implementing embodiments of the present invention. FIG. 5A shows one possible physical form of computer system 100. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 5B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For example, the installation detection engine can execute on a server computer as part of network and check installations for numerous client computers. Therefore, the described embodiments should be taken as illustrative and not restrictive, and the invention should not be limited to the details given herein but should be defined by the following claims and their full scope of equivalents.

I claim:

1. A method of preventing installation of a spyware, the method comprising:
   during installation of the spyware on a computer receiving installation data on the computer, wherein the installation data relates to file modification, and process execution;
   transforming the installation data into feature value data using a list of features, wherein a feature of the list of features is a specific installation behavior and the feature value data is a quantified value of the specific installation behavior;
   inputting the feature value data into a rule matcher to match one or more correlation rules in a rule library, wherein a single correlation rule in the rule library defines a combination of features of the list of features and the feature value data as the spyware installation;

determining whether the spyware is being installed on said computer based on output of said rule matcher, after said feature value data has been inputted;

blocking spyware from being installed on said computer if it is determined that the spyware is being installed; and alerting a user.

2. A method as recited in claim 1 wherein receiving installation data further comprises receiving file creation and modification data.

3. A method as recited in claim 1 wherein receiving installation data further comprises receiving registry creation and modification data.

4. A method as recited in claim 1 wherein the one or more correlation rules are derived from known spyware installation techniques.

5. A method as recited in claim 1 further comprising automatically preventing installation of spyware if it is determined that spyware is being installed.

6. A method as recited in claim 1 wherein receiving installation data further comprises:

receiving execution behavior data.

7. A method of preventing installation of a spyware, the method comprising:

during installation of the spyware on a computer, receiving behavior data relating to installation activities on the computer, wherein the installation data relates to file modification, and process execution;

transforming the behavior data to feature value data using a list of features, wherein a feature of the list of features is a specific installation behavior and the feature value data is a quantified value of the specific installation behavior;

applying correlation rules to the feature value data, wherein a correlation rule of correlation rules defines a combination of features of the list of features and the feature value data as the spyware installation;

determining whether the feature value data will cause the spyware to reside on the computer based on output of applying the correlation rules to said feature value data; and providing a result of said determination to a component which can terminate executing the installation activities if desired.

8. A method as recited in claim 7 wherein receiving behavior data relating to installation activities further comprises receiving file creation and modification data.

9. A method as recited in claim 7 wherein receiving behavior data relating to installation activities further comprises receiving registry creation and modification data.

10. A method as recited in claim 7 wherein receiving behavior data relating to installation activities further comprises receiving behavior data from a plurality of behavior detectors.

11. A method as recited in claim 7 wherein determining whether behavior data will cause spyware to reside on the computer further comprises examining an output of the application of the correlation rules to the feature value data.

12. A method as recited in claim 7 wherein receiving behavior data relating to installation activities further comprises:

receiving behavior data relating to spyware execution activities.

13. A computer comprising:

a processor for executing a correlation engine during installation of a spyware on the computer;

an event collector module that observes and collects installation data that relates to file modification, and process execution, and transforms the installation data into feature value data using a list of features, wherein a feature of the list of features is a specific installation behavior and the feature value data is a quantified value of the specific installation behavior;

a network interface; and a memory for storing a rule library that contains a correlation rule set, wherein a correlation rule of the correlation rule set defines a combination of features of the list of features and the feature value data which indentifies installation of the spyware, and for storing a rule matcher to match correlation rules of the correlation rule set to the feature value data and determinate whether the spyware is being installed on the computer based on a outputted match result; and wherein spyware is blocked from being installed on said computer if it is determined that the spyware is being installed.

14. A computer as recited in claim 13 further comprising external installation detection components for collecting installation data.

15. A computer as recited in claim 13 further comprising a set of feature values used for representing the installation data.

\* \* \* \* \*

UNITED STATES PATENT AND TRADEMARK OFFICE
CERTIFICATE OF CORRECTION

PATENT NO.       : 7,840,958 B1                                        Page 1 of 1
APPLICATION NO.  : 11/356600
DATED            : November 23, 2010
INVENTOR(S)      : Xiaochuan Wan It is certified that error appears in the above-identified patent and that said Letters Patent is hereby corrected as shown below:

Column 10, line 31    Change "indentifies" to --identifies--

Signed and Sealed this
Fifth Day of June, 2012

David J. Kappos
*Director of the United States Patent and Trademark Office*